United States Patent [19]

Maly et al.

[11] 4,152,204

[45] May 1, 1979

[54] DEVICE FOR CONTROLLING THE POWER OUTPUT OF A CORE REACTOR AND FOR TURNING OFF THE SAME

[75] Inventors: Vladimir Maly; Eberhard Teuchert, both of Jülich, Fed. Rep. of Germany

[73] Assignee: Kernforschungsanlage Jülich Gesellschaft mit beschränkter Haftung, Jülich, Fed. Rep. of Germany

[21] Appl. No.: 731,673

[22] Filed: Oct. 12, 1976

Related U.S. Application Data

[63] Continuation of Ser. No. 518,755, Oct. 19, 1974, abandoned.

[30] Foreign Application Priority Data

Oct. 26, 1973 [DE] Fed. Rep. of Germany ....... 2353653

[51] Int. Cl.² ............................................... G21C 7/08
[52] U.S. Cl. ..................................... 176/18; 176/36 R; 176/86 R; 176/58 PB
[58] Field of Search ....................... 176/17, 18, 45, 46, 176/36 R, 33, 86 R, 41, 58 PB

[56] References Cited

U.S. PATENT DOCUMENTS

| | | | |
|---|---|---|---|
| 3,036,964 | 5/1962 | Horning | 176/86 R |
| 3,052,613 | 9/1962 | Wigner et al. | 176/46 |
| 3,089,836 | 5/1963 | Wootton | 176/86 R |
| 3,100,187 | 8/1963 | Fraas | 176/41 |
| 3,202,581 | 8/1965 | Barr et al. | 176/46 |
| 3,321,371 | 5/1967 | Kambara et al. | 176/33 |
| 3,349,004 | 10/1967 | Lass et al. | 176/86 R |
| 3,519,536 | 7/1970 | Rausch | 176/36 |

FOREIGN PATENT DOCUMENTS 2123894 12/1972 Fed. Rep. of Germany ...... 176/58 PB

*Primary Examiner*—Harvey E. Behrend
*Attorney, Agent, or Firm*—Walter Becker

[57] ABSTRACT

A device for controlling the power output of a core reactor and for turning off the same, in which that portion of the device which contains absorber material comprises a first component in the form of absorber rods for turning off the core reactor which absorber rods are movable into the filling provided in the reflector of the reactor. That portion of the device which contains absorber material furthermore comprises a second component in the form of plates which serve for controlling the output of the core reactor and are displaceable in that chamber portion of the reflector which is defined by the top surface of the filling and by the reflector wall above the filling.

2 Claims, 2 Drawing Figures

DEVICE FOR CONTROLLING THE POWER OUTPUT OF A CORE REACTOR AND FOR TURNING OFF THE SAME

This is a continuation of application Ser. No. 518,755—Maly filed Oct. 29, 1974, now abandoned.

The present invention relates to a device for controlling the power of and turning off a core reactor with a reflector of graphite, which reflector contains a filling or pile of ball-shaped fuel and/or breeder elements, while the component of the device which contains absorbing material is, for controlling the power of the core reactor and/or for turning off the reactor, by that part of the reflector wall which is located above said pile or filling, movable up to a predetermined depth into the chamber surrounded by the reflector. During this movement, and due to the absorbing material, the neutrons which become free during the fission process are absorbed so that the reactivity of the reactor is lowered.

With the heretofore known core reactors with a pile or filling of ball-shaped fuel and/or breeder elements, that component of the device for power control and turning off the core reactor, which component contains absorbing material, consists of cylindrical rods which for controlling the reactor are moved into the filling or into the reflector surrounding the filling. By varying the penetration depth of said rods, the reactivity of the core reactor is changed and, in view of the change in reactivity, the power output of the core reactor is increased or reduced. With core reactors having an electrical power output of up to 300 MW, a device with absorber rods moved into the reflector surrounding the pike or filling was preferred. In order to make sure that also with possibly occurring displacements of the graphite blocks of the reflector, the ability of the device to function will be maintained, the rods were made of a plurality of elements movable relative to each other. In view of the rods moved into the reflector, the neutron flow in the reflector and into the outer zones of the filling adjacent the reflector were lowered whereby the reactivity of the core reactor was reduced. This design, however, had the drawback that the thermal neutron flow was displaced into the interior region of the reactor core. As a result thereof, the temperature in the interior range of the filling was considerably higher than in the marginal zone of the filling so that the cooling gas flowing through the axis-near region of the filling reached higher temperatures than that portion of the cooling gas which flowed through the marginal zone of the filling. This is disadvantageous because in the inserts which follow the filling in the direction of flow of the cooling gas, for instance, in the heat exchanger, certain tensions occurred due to the temperature drop, and as a result these inserts were continuously subjected to temperature change loads, also in view of the continuously changing directions of the flow lines of the cooling gas. With larger core reactors with an electrical output of, for instance, 1000 MW, a control by means of absorber rods movable into the reflector surrounding the filling was no longer possible because the decrease in the neutron flow obtained by moving in the absorber rods no longer sufficed to control the power of the core reactor.

In order to be able at any desired time to control a load change from 100% to 40% and from 40% again to 100% of the output of the core reactor, it has been suggested with larger core reactors to provide an arrangement which is movable into the pile or filling and within the filling or pile in a predetermined manner, and which contains absorbing material. This heretofore known arrangement comprised a plurality of cylindrical rods, which arrangement was movable into the filling or pile through the reactor wall above the filling or pile. While this arrangement made possible a control of the output of even larger core reactors of the above mentioned type, it has proved disadvantageous that in this connection a pressure was exerted by the absorber rods upon the fuel and/or breeder elements adjacent to said absorber rods. This pressure became higher the greater necessarily the number of the rods was and the deeper the rods were moved into the pile or filling. Due to the compression of the filling as it occurred during the movement of the absorber rods in the filling, it was necessary to exert an increased pressure in order to bring the absorber rods to the penetration depth necessary for the control. The maximum pressure exerted in this connection by the fuel and/or breeder elements frequently approached the boundaries of the mechanical loadability of the fuel and/or breeder elements.

Inasmuch as it was very difficult to foresee the effect of the compression in the filling as brought about by the displacement of the absorber rods within the filling, upon the moving of the absorber rods into the filling it was necessary so to design the driving units of the absorber rods that the absorber rods could be moved upwardly and downwardly in the filling even if the filling was compressed to a high extent. Such an arrangement entailed, of course, high costs. A further drawback of the control of the output of the core reactor by means of absorber rods movable into the filling consisted in that fuel and/or breeder element balls in the vicinity of which, and for a longer period of time, and absorber rod moved into the filling was located and which fuel and/or breeder element balls during this time period were exposed only to a low thermal neutron flow, were exposed to a high thermal neutron flow as soon as the absorber rods were pulled out of the filling. The disadvantageous result was that very high output peaks occurred in the fuel and/or breeder elements.

As further drawback in connection with the control of a core reactor by means of absorber rods moved into the graphite of the reflector or by means of an absorber moved into the filling, consists is that the efficiency of the absorber rods was limited in view of the occurring alternating effect with their direct surrounding. In this connection, it should be noted that due to the absorption of the thermal neutrons into the absorber rods, the flow of neutrons in the immediate vicinity of the absorber rods is lowered so that the lowering of the neutron flow of the core reactor obtainable by the individual absorber rods is reduced. This entailed the disadvantageous result that the arrangement for controlling the output of the core reactor required a great number of absorber rods, or the absorber rods for controlling the output had to be moved into the filling or pile.

Therefore, it is an object of the present invention to provide a simple and thus economically produceable device for controlling the power output of a core reactor and for turning off the core reactor, which will overcome the above mentioned drawbacks.

It is another object of this invention to provide a control device as set forth in the preceding paragraph, in which the heretofore encountered drawbacks in connection with the controlling of the power output of a core reactor and the turning off a core reactor will be avoided even if the electrical output of the core reactor exceeds 300 MW.

The above outlined problem has, according to the present invention, been solved with a core reactor according to the present invention, by composing that component of the device which contains the absorbing material, of a part for turning off the core reactor and of a part of controlling the output of the core reactor while that part which serves for turning off the core reactor is movable into the filling and while that part of the device which serves for controlling the output is movable within the wall of that portion of the reflector which is located above the filling and is displaceable in the hollow chamber confined by the surface of the filling and by that portion of the reflector which is located above the filling. The penetration depth of that portion which serves for controlling the output power is confined from below by the surface of the filling.

The invention is based on the finding that due to that part of the device which is moved into the wall of the portion of the reflector located above the filling and due to the portion of the device moved into the hollow chamber above the filling, the neutron flow in the upper part of the reflector and in said hollow chamber and thus in the pile of the fuel elements is reduced. In this connection, it has been found that the neutron flow in the reactor core and thus the output of the reactor are lowered all the more, the more absorbing material acting as neutron absorber is introduced into said hollow chamber. Surprisingly, it has been found that the efficiency of that component of the device which contains that portion of the absorbing material which is introduced into said hollow chamber for controlling the core reactor, and which component is intended for the power output control and for turning off the core reactor (in contrast to heretofore known core reactors with absorber rods moved into the reflector or into the filling) will not be reduced by lowering the neutron flow in the immediate vicinity of that portion of the device which is moved into said hollow chamber. Rather—due to the very long free length of the path of the neutron is said hollow chamber—the neutron flow due to the portion of the device introduced into the hollow chamber for the power output control and the turning off of the core reactor is reduced in the entire vicinity of the hollow chamber, in other words, also in the freshly added fuel and/or breeder elements in the uppermost layers of the filling.

A considerable advantage of the device according to the present invention thus consists in that that portion of the device which is intended for controlling the output of the core reactor is moved only in the reflector wall located above the hollow chamber, and in the hollow chamber itself. During the power output control, therefore, no force has to be overcome which acts against the direction of movement of the pertaining part of the device for controlling the power output and for turning off the device. This is in contrast to the heretofore known core reactors in which the power output control is effected by means of absorber rods moved into the filling. It is also advantageous that the component which contains the absorber material and serves for controlling the power output is, according to the invention, considerably shorter than is the case of comparable devices of heretofore known core reactors. This entails the further advantage that for driving that portion of the device which serves for controlling the power smaller driving units can be employed than was the case with heretofore known core reactors.

It has also proved extremely advantageous that due to that portion of the device according to the invention which is inserted into the hollow chamber for controlling the power output, the neutron flow in the vicinity of the hollow chamber and thus also in the fuel and/or breeder elements of the upper layer of the filling and — even though to a minor extent in the lower layers of the filling is uniformly lowered without local output peaks occurring in the filling, which peaks occur with heretofore known core reactors which are controlled by means of absorber rods introduced into the filling. This also favorably affects the temperature distribution in the cooling gas as well as the life span of the fuel and/or breeder elements.

When the core reactor with its device according to the invention is operated in such a way that the fuel and/or breeder elements pass through the filling only once, it has been found that that portion of the device according to the invention becomes particularly effective which for purposes of controlling the core reactor is moved into the hollow chamber. It is in this way that the neutron flow in the hollow chamber and in the vicinity of the hollow chamber is reduced. In this way, the axial neutron flow profile is so deformed in the core of the reactor that the absorbing effect of the fission products in the burned-off fuel and/or breeder elements increases in the lower core range. As has been proved, the efficiency of that portion of the device according to the invention which contains the absorbing material is increased by from 20 to 40%.

According to a further advantageous development of the device according to the invention, that portion of the device which is intended for controlling the output of the core reactor is composed of a plurality of plates containing absorbing material. The design of the plates, the longest extension of which is expediently in the direction of the axis of the reactor core is limited only by its mechanical bending strength which is anyhow subjected only to low stresses because the plates are not moved into the filling. Since plates of this type have a considerably larger surface than cylindrical absorber rods, it will be appreciated that simultaneously the surface containing absorbed material is greatly enlarged. This brings about, with the same effect, a considerable saving in material.

It has also proved expedient when that portion of the device which serves for turning off a core reactor, for controlling the output of the core reactor is displaceable also within the wall of the part of the reflector located above the filling and within the hollow chamber limited by the surface of the filling and that portion of the reflector which is located above the filling. Due to the fact that that portion of the device according to the invention which serves for turning off the core reactor is during the operation of the reactor, also employed for controlling the power output, it is possible further to simplify that portion of the device which serves the control of the power output.

By way of example, two core reactors of the same output and of the same geometric dimensions will not be compared with each other. One of said core reactors comprises a device for controlling the power output and for turning off the reactor according to the present invention, whereas the device for power control of the other reactor is composed of absorber rods which are moved into the filling. Both core reactors have a total output of 500 MW$_{th}$. The height of the core amounts to approximately 600 cm. The radius is precisely 240 cm. The height of the hollow chamber is 100 cm. The fuel elements consist of covered particles of UO$_2$ which are arranged in a graphite ball, said balls having an outer radius of 3 cm. The heavy metal content amounts per ball to 10.7 g per each ball of 6.5% enriched uranium. The pouring density of the balls in the core amounts to 0.61. As cooling gas, helium of 40 atmospheres is employed. The thickness of the upper reflector amounts to 100 cm., whereas the thickness of the lower reflector amounts to 150 cm. The thickness of the mantle reflector is 100 cm. The graphite density is approximately 1.6 grams per cubic cm. The absorbing material containing part of the device for controlling the output of the reactor for turning off the reactor comprises with both reactors 19 absorber rods each having a diameter of 13 cm. While one rod is arranged centrally in the reactor core and each 6 rods are arranged along circles respectively having radii of 100 cm, 130 cm, and 175 cm around the central rod.

Experience has shown that for controlling the core reactor at a load change operation from 100% to 40% and from 40% to 100% makes necessary a reactivity change of the reactor by 2.4%. This change is realized with the heretofore known core reactor by changing the penetration depth of the 19 rods in the filling or pile by approximately 60 cm. With the core reactor having a device according to the present invention, the reactivity is by moving the rods into the wall of the upper reflector decreased by approximately 0.7%, and by moving the rods into the hollow chamber is decreased by an additional 1.8%, which means is lowered by a total of 2.5%.

Thus, with a portion of the device comprising cylindrical absorber rods and serving the control of the output, it is possible when moving said rods into the upper reflector and into the hollow chamber, to realize a sufficiently high change of the neutron flow in order to be able to carry out a load change from 100% to 40% and from 40% to 100% at any desired time.

Such load change is with the core reactor with a simplified embodiment of the device according to the invention but with otherwise equal geometric dimensions and output of the reactor likewise obtainable at any time. If, namely, instead of 19 cylindrical absorber rods, 8 plates with a cross section of 8 times 40 cm are arranged circularly around the axis of the reactor core with a radius of 150 cm, it will be possible by moving said 8 plates into the wall of the upper reflector and into the hollow chamber likewise to realize a reactivity change by 2.5%.

The invention is illustrated by way of example in the accompanying drawing, in which.

Figure 1:
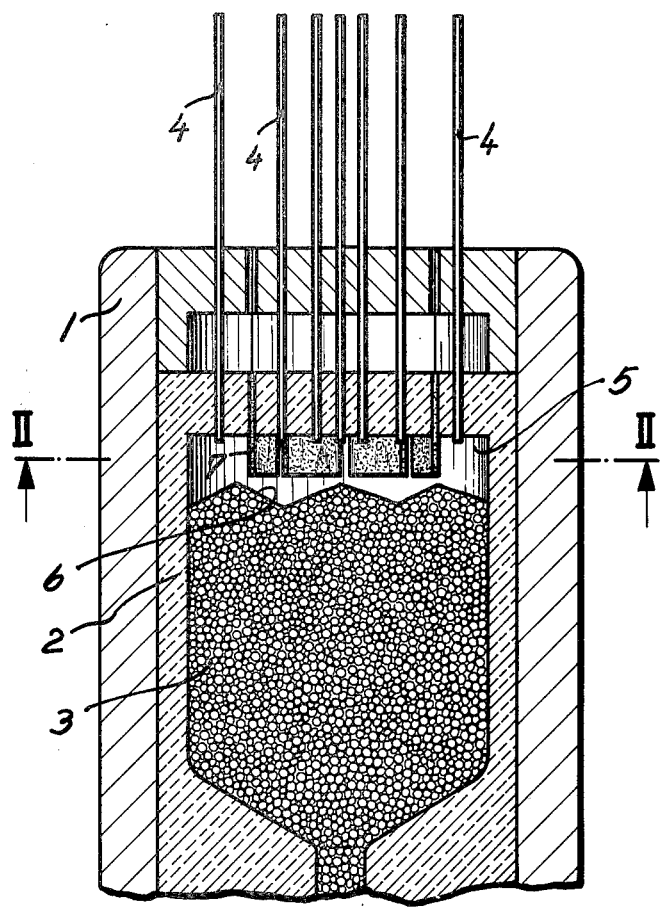
FIG. 1 is a vertical section through a core reactor according to the invention.
Figure 2:
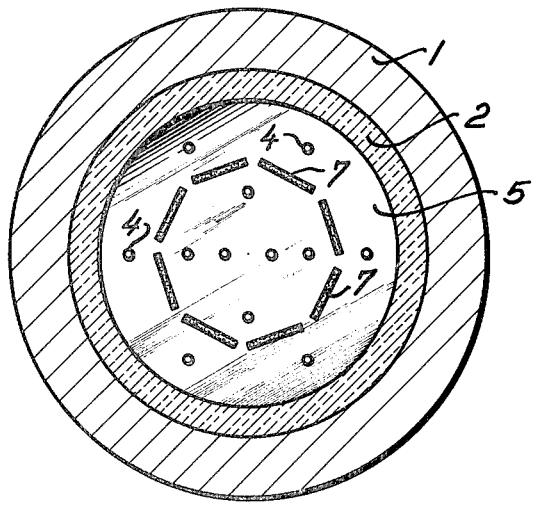
FIG. 2 is a cross section along the line II—II of FIG. 1.

Referring now to the drawing in detail, the reactor 1 comprises a reflector 2 of graphite which contains a filling 3 of ball-shaped fuel and/or breeder elements. In customary manner, the reactor comprises a device for controlling the power output and for turning off the core reactor. More specifically, according to this invention, the device comprises a first absorber material containing component for turning off the core reactor, which first component in the form of absorber rods 4 is movable into said filling 3. The device also comprises a second absorber material containing component which serves for controlling the output of the core reactor and is displaceable within that chamber portion 5 of the reflector 2 which is defined by the top surface 6 of the filling 3 and by the reflector wall above said filling 3. The depth to which said second component is movable into said chamber portion 5 is limited from below by the top surface 6 of said filling 3. In this connection, it has proved particularly advantageous within the ambit of the present invention to make said second component of a plurality of plates 7 containing absorber material.

According to a further feature of the invention, the first component 4 for turning off the core reactor is for controlling the output of the core reactor also displaceable in a predetermined manner within that chamber portion 5 of the reflector 2 which is defined by the top surface 6 of the filling 3 and the reflector portion above the level of said surface 6.

It is, of course, to be understood that the present invention is, by no means, limited to the specific showing in the drawing, but also comprises any modifications within the scope of the appended claims.

What we claim is:

1. In a core reactor comprising a graphite vessel having walls, and a top cover that serve as a reflector and having a filling of a mass of ball-shaped fuel and breeder elements defining a top surface and having a chamber portion therewith: the improvement in combination therewith comprising a device for controlling the power output of said core reactor and for turning off the same, said device including a first absorbing material containing component in the form of absorber rods movable into said filling of fuel and breeder elements when received in said reflector of graphite for turning off said reactor, said device also including a second neution absorbing material containing component for controlling the output of the core reactor, said second component being separate and distinct distinct from said first component and including a plurality of separate and independent plates vertically displaceable only above the filling within that chamber portion of said reflector which is defined by the top surface of said filling of fuel and breeder elements when received is said reflector of graphite, and is further defined by the top cover which is above the level of said filling of fuel and breeder elements, the depth to which said second component is movable only from said top cover into said chamber portion being limited from below by the top surface of said filling of fuel and breeder elements, and drive means in essence sufficient to overcome gravity for lifting the second absorbing material component for controlling the output of the core reactor, the second abosrbing material component being distributed over a length which corresponds approximately to height of the hollow chamber including thickness of said reflector.

2. In a core reactor in combination according to claim 1, in which said second component for controlling reactor output from above comprises a plurality of members having an area exposed above said filler component and containing neutron absorber material movable into said chamber portion above the fuel and breeder elements in order to decrease neutron flow in said chamber portion and thereby also to decrease neutron flow in said filling of fuel and breeder elements.

* * * * *